(12) United States Patent
Light et al.

(10) Patent No.: US 7,609,167 B1
(45) Date of Patent: Oct. 27, 2009

(54) SYSTEM AND METHOD FOR SECURE NETWORKING IN A VIRTUAL SPACE

(75) Inventors: Elliott D. Light, Rockville, MD (US); Jon L. Roberts, Great Falls, VA (US)

(73) Assignee: Robelight LLC, Great Falls, VA (US)

( * ) Notice: Subject to any disclaimer, the term of this patent is extended or adjusted under 35 U.S.C. 154(b) by 0 days.

(21) Appl. No.: 12/391,741

(22) Filed: Feb. 24, 2009

Related U.S. Application Data

(63) Continuation of application No. 12/104,939, filed on Apr. 17, 2008, now Pat. No. 7,508,310.

(51) Int. Cl.
    *G08B 23/00* (2006.01)
(52) U.S. Cl. .................. 340/573.1; 340/539.1; 340/5.1; 709/238; 709/223; 715/763
(58) Field of Classification Search ............... 340/539.1, 340/539.11, 539.16, 573.1, 5.1, 5.8, 5.81; 709/238, 223; 715/763
    See application file for complete search history.

(56) References Cited

U.S. PATENT DOCUMENTS

| | | | |
|---|---|---|---|
| 6,491,217 B2 | 12/2002 | Catan | |
| 6,618,593 B1 | 9/2003 | Drutman | |
| 6,664,891 B2 | 12/2003 | Davies et al. | |

(Continued)

FOREIGN PATENT DOCUMENTS

DE      10357305      7/2005

OTHER PUBLICATIONS

Mnoon, Comment in CNET Reviews, (2 pp. downloaded from Google.com, May 16, 2005).

(Continued)

*Primary Examiner*—Toan N Pham
*Assistant Examiner*—Travis R Hunnings
(74) *Attorney, Agent, or Firm*—The Marbury Law Group PLLC

(57) ABSTRACT

Secure networking in a virtual space over a network. Subscriber computing devices each operated by a subscriber are associated with a subscriber identifier. Each computing device is connected to the network. A subscriber security profile is created in a security profile datastore, wherein the subscriber security profile comprises information indicative of a security status and wherein the subscriber security profile is associated with the subscriber's subscriber identifier. Subscriber identifiers associated with subscribers who are logged in to a website are monitored. The website defines a virtual space and the logged-in subscribers are characterized as present in the virtual space. A web page is served to the computing devices of the present subscribers via the network. The web page of a first subscriber comprises a first subscriber icon associated with the first subscriber and subscriber icons of other present subscribers. A determination is made whether the first subscriber security profile matches the subscriber security profile of one or more of the other present subscribers according to security matching criteria. An attribute is assigned to the icons of the other present subscribers having security profiles that match the security profile of the first subscriber according to security matching criteria. Selected security profile information is provided to the first subscriber of a selected one of any of the other present matching subscribers.

20 Claims, 7 Drawing Sheets

U.S. PATENT DOCUMENTS

| | | |
|---|---|---|
| 6,690,918 B2 | 2/2004 | Evans et al. |
| 6,711,414 B1 | 3/2004 | Lightman et al. |
| 6,757,719 B1 | 6/2004 | Lightman et al. |
| 6,758,397 B2 | 7/2004 | Catan |
| 6,892,066 B2 | 5/2005 | Detweiler et al. |
| 6,961,000 B2 | 11/2005 | Chung |
| 6,977,612 B1 | 12/2005 | Bennett |
| 6,992,574 B2 | 1/2006 | Aupperle et al. |
| 6,996,402 B2 | 2/2006 | Logan |
| 7,092,002 B2 | 8/2006 | Ferren et al. |
| 7,098,793 B2 | 8/2006 | Chung |
| 7,206,568 B2 | 4/2007 | Sudit |
| 7,216,109 B1 | 5/2007 | Donner |
| 7,280,822 B2 | 10/2007 | Fraccaroli |
| 7,310,676 B2 | 12/2007 | Bourne |
| 2004/0120298 A1 | 6/2004 | Evans et al. |
| 2005/0174975 A1 | 8/2005 | Mgrdechian et al. |
| 2005/0272413 A1 | 12/2005 | Bourne |
| 2005/0282530 A1 | 12/2005 | Raff |
| 2006/0085419 A1 | 4/2006 | Rosen |
| 2006/0109083 A1 | 5/2006 | Rathus et al. |
| 2006/0256959 A1 | 11/2006 | Hymes |
| 2007/0030824 A1 | 2/2007 | Ribaudo et al. |
| 2007/0032240 A1 | 2/2007 | Finnegan et al. |
| 2007/0096909 A1 | 5/2007 | Lally |
| 2008/0140650 A1* | 6/2008 | Stackpole .................... 707/5 |

OTHER PUBLICATIONS

McCarthy, J.; McDonald D.; Soroczak, S.; Nguyen D.; Rashid, A: "Augmenting the Social Space of an Academic Conference", (10 pp downloaded from Google.com, Nov. 2004).

* cited by examiner

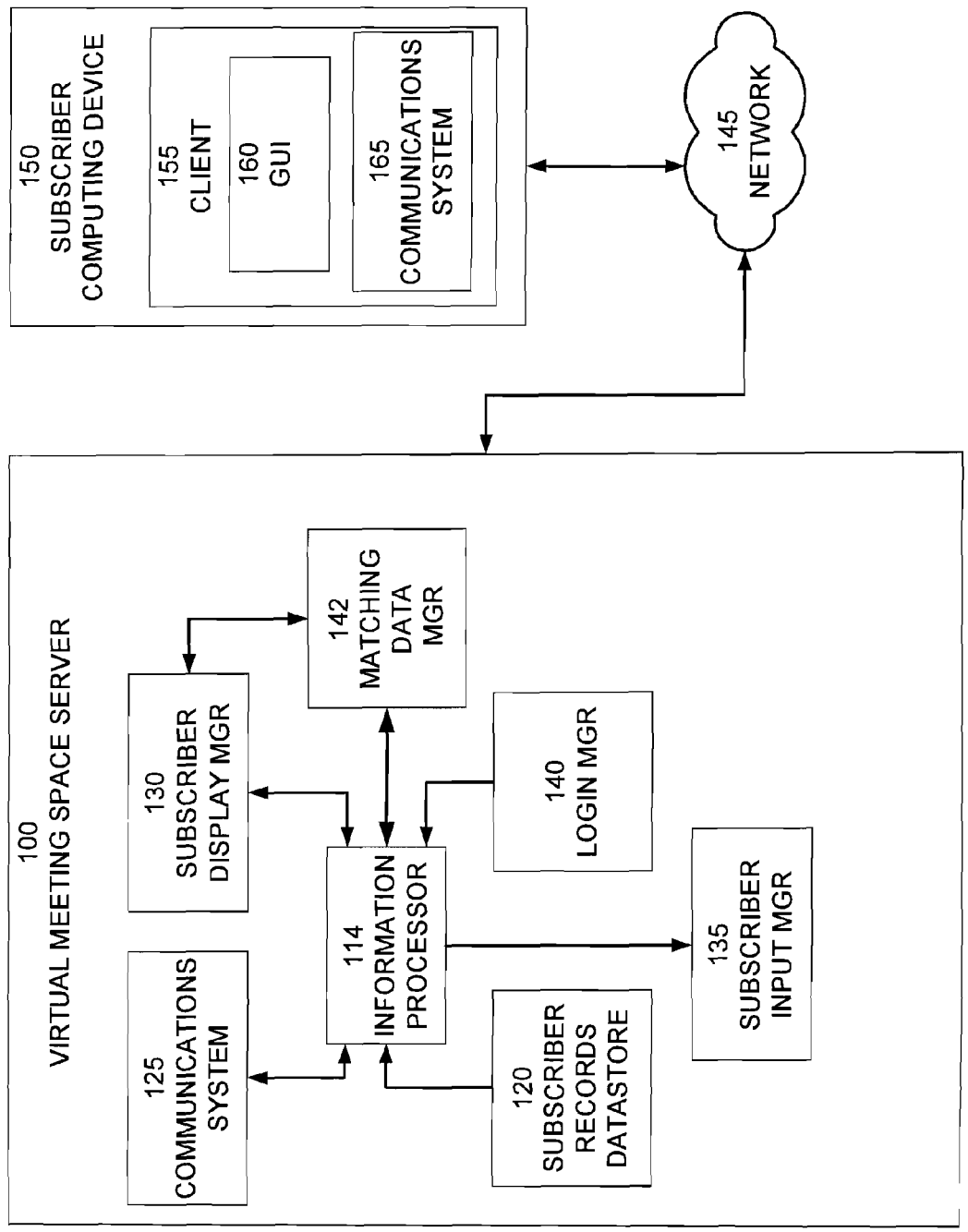

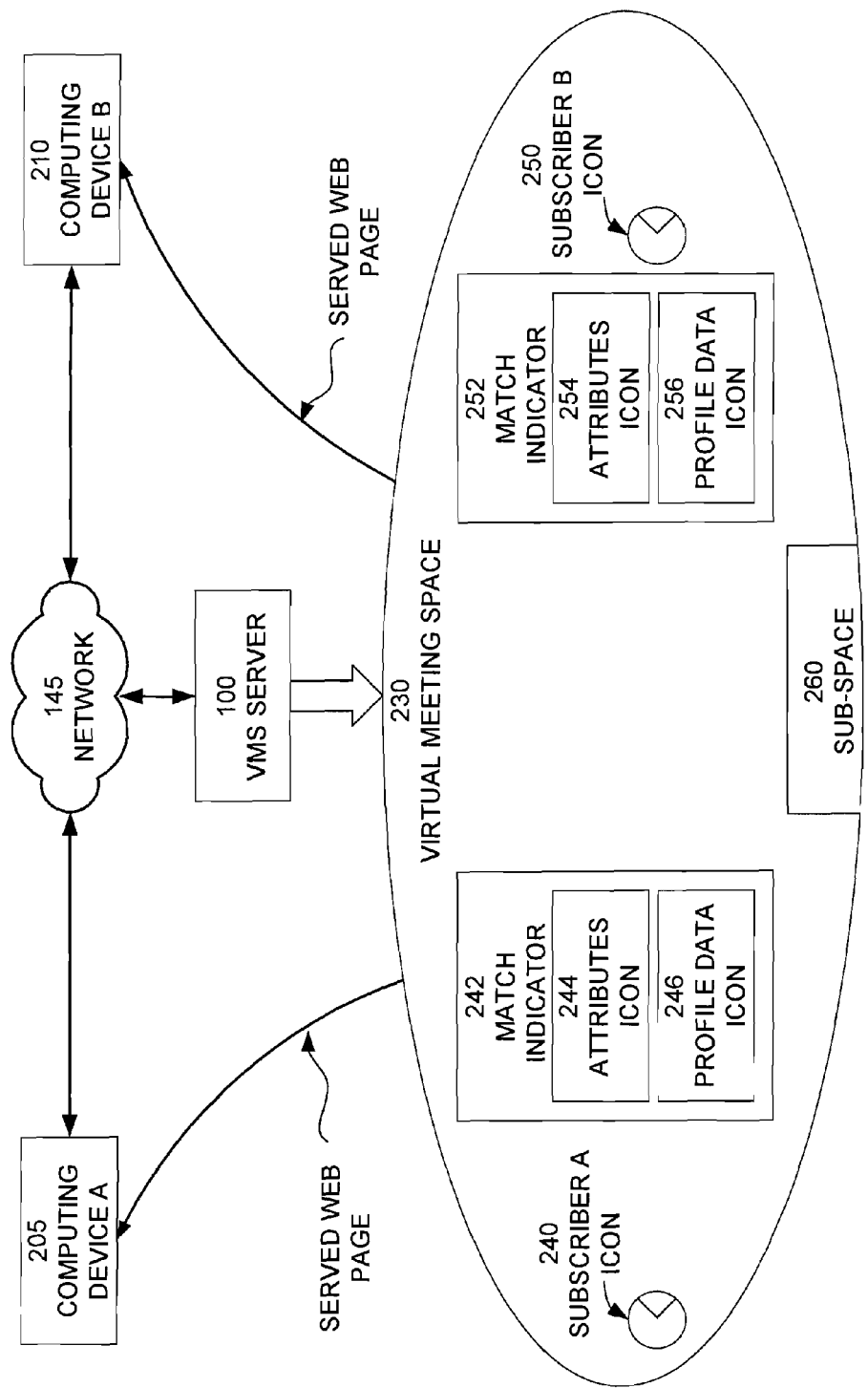

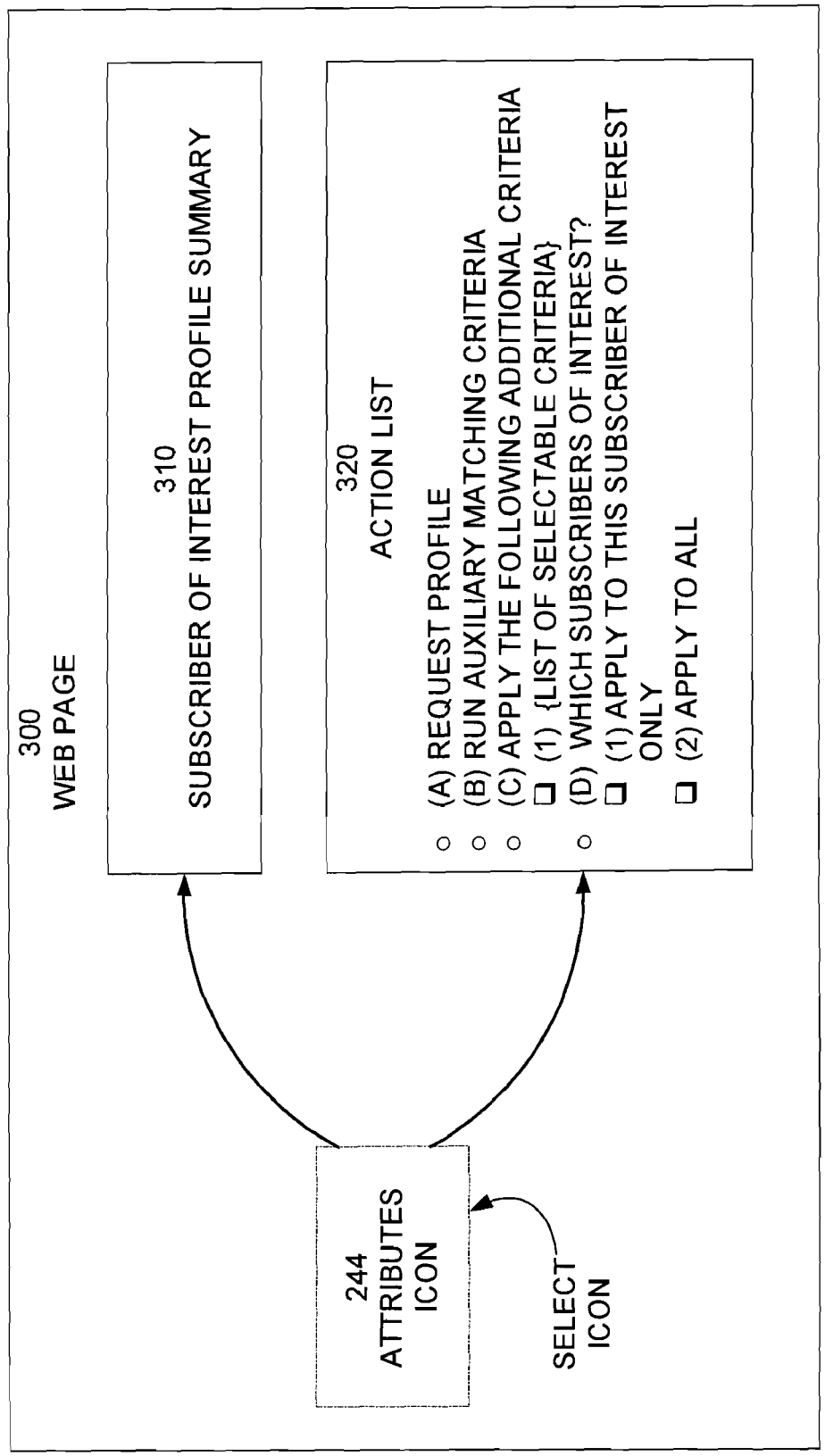

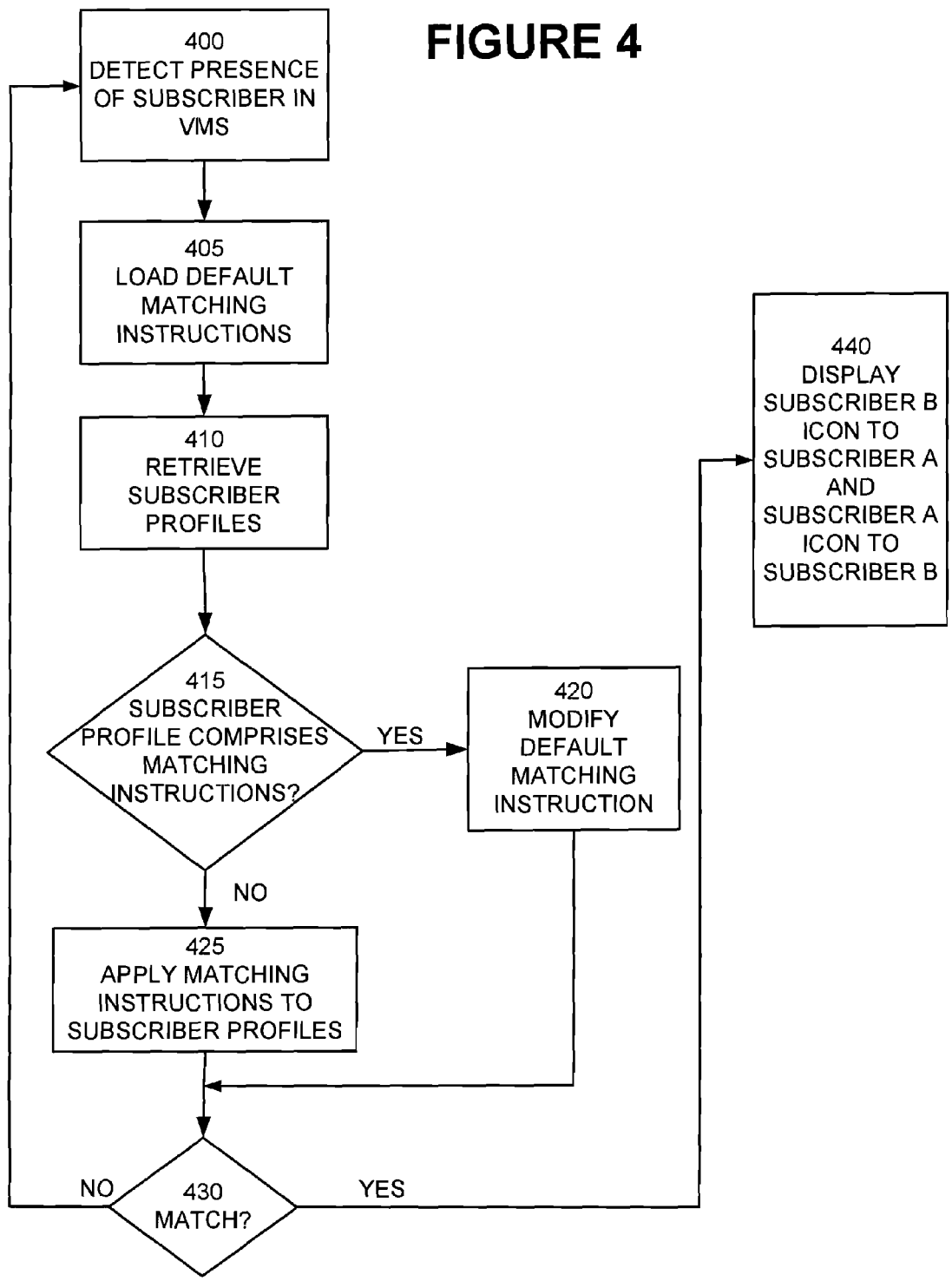

SYSTEM AND METHOD FOR SECURE NETWORKING IN A VIRTUAL SPACE

RELATIONSHIP TO OTHER APPLICATIONS

This application is a continuation of U.S. application Ser. No. 12/104,939 filed Apr. 17, 2008 now U.S. Pat. No. 7,508,310. The Ser. No. 12/104,939 application from which priority is claimed is incorporated by reference for all purposes.

BACKGROUND AND SUMMARY

Conceptually, the world can be divided into those with needs and/or desires and people with potential means of satisfying those needs and/or desires. For example, a salesperson may be seeking potential clients. A single person may be seeking a dating partner. A guitar player may be seeking a drummer. A shopper may be looking for a particular item to buy. The difficulty has been in bringing the seekers into proximity and in providing them sufficient information to allow them to decide if their interests coincide.

Solutions to this problem are sometimes referred to as matching systems and involve varying mechanisms for assessing whether a profile of the problem owner and a profile of a solution owner "match" sufficiently to provide information to at least one of the parties about the other. For example, RFID, GPS, and Bluetooth technology have been proposed to identify individuals with related interests when they are in proximity to each other. If the individuals are sufficiently close to each other, various systems have been combined with profile records to determine if the individuals have interests that "match" and, if so, to facilitate the exchange of location information between the individuals. Ad hoc wireless networks have also been described that facilitate such an exchange. Reference is made to U.S. Pat. Nos. 6,711,414 and 6,757,719 to Lightman et al., 6,977,612 to Bennet, 6,996,402 to Logan, 6,618,593 to Drutman, 6,419,217 and 6,758,397 to Catan, 7,098,793 and 6,961,000 both to Chung, 6,992,574 to Aupperle, et al., and 7,092,002 to Ferren et al., U.S. Patent Application 2005/0174975 filed by Mgrdechian, et al., U.S. Patent Application 2007/0030824 filed by Ribaudo et al., U.S. Patent Application 2006/0256959 filed by Hymes, U.S. Patent Application 2007/0096909 filed by Lally, and U.S. Patent Applications 2005/0177614 and 2005/0272413 filed by Bourne, and U.S. Pat. No. 7,342,503 to Light et al., all of which are incorporated herein by reference for all purposes.

These solutions are generally directed to providing information to individuals having matching profiles who are present in a physical space.

What would be useful is an information exchange system that provides visual and physiological cues to users in a virtual space.

In an embodiment, a virtual meeting space is established over a network using a server. The server establishes a domain in which subscribers are permitted to mix. A subscriber has a profile comprising information about the subscriber, matching criteria, and communication preferences. The subscriber is assigned a virtual "badge." An information processor is configured to store profiles of subscribers, to receive the information establishing the presence of subscribers, and to determine whether the profiles of subscribers match according to matching criteria.

In an embodiment, a system for social networking in a virtual space comprises a network, subscriber computing devices each operated by a subscriber, wherein the subscriber is associated with a subscriber identifier and wherein each computing device is connected to the network, a profile datastore, wherein the profile datastore comprises a subscriber profile comprising information about the subscriber and wherein the subscriber profile is associated with the subscriber's subscriber identifier, and an information processor connected to the network.

The information processor comprises instructions for monitoring subscriber identifiers associated with subscribers who are logged into a website, wherein the website defines a virtual space and the logged-in subscribers are characterized as present in the virtual space, serving a web page to the computing devices of the present subscribers via the network, wherein the web page of a first subscriber comprises a first subscriber icon associated with the first subscriber and subscriber icons of other present subscriber, determining whether the first subscriber profile matches the subscriber profile of one or more of the other present subscribers according to matching criteria, assigning an attribute to the icons of the other present subscribers having profiles that match the profile of the first subscriber according to the matching criteria, and providing selected profile information to the first subscriber of a selected one of any of the other present matching subscribers.

By way of illustration and not as a limitation, a subscriber computing device may be a desktop computer, a laptop computer, a PDA, a cellphone, or a smartphone.

By way of illustration and not as a limitation, the network may be a wired network, a wireless network, a fiber network, a secure wired network, a secured wireless, and a secured fiber network.

By way of illustration and not as a limitation, the subscriber icons may be a geometric shape, an avatar, a shape of an animal, a shape of an object.

By way of illustration and not as a limitation, the profile information may include personal data and preference data.

By way of illustration and not as a limitation, an attribute may be a color, a hue, a size, a shape, a sound, flashing, or a periodic change from one attribute to another attribute.

In an embodiment, the virtual space is representative of a real space the web page comprises a graphical depiction of the virtual space. In this embodiment, the information processor further comprises instructions for determining a location of the subscriber computer relative to the real space and the first subscriber icon and the other present subscriber icons are displayed relative to their locations in the real space.

By way of illustration and not as a limitation, the real space may be a country, a city, a geographic region, a shopping mall, a trade show venue, a social venue, a school, a university, a bar, a night club, or a sports venue.

In yet another embodiment, the computing devices are wireless devices, the network is a wireless network, and the first subscriber and the other present subscribers are physically located in the real space.

An embodiment comprises a method for social networking in a virtual space over a network. Subscriber computing devices each operated by a subscriber are associated with a subscriber identifier. Each computing device is connected to the network. A subscriber profile is created in a profile datastore, wherein the subscriber profile comprises information about the subscriber and wherein the subscriber profile is associated with the subscriber's subscriber identifier. Subscriber identifiers associated with subscribers who are logged in to a website are monitored. The website defines a virtual space and the logged-in subscribers are characterized as present in the virtual space. A web page is served to the computing devices of the present subscribers via the network. The web page of a first subscriber comprises a first subscriber icon associated with the first subscriber and subscriber icons of other present subscribers. A determination is made whether the first subscriber profile matches the subscriber profile of one or more of the other present subscribers according to matching criteria. An attribute is assigned to the icons of the other present subscribers that match the profile of the first subscriber according to matching criteria. Selected profile information is provided to the first subscriber of a selected one of any of the other present matching subscribers.

In another embodiment, a system for secure networking in a virtual space comprises a network, subscriber computing devices each operated by a subscriber, wherein the subscriber is associated with a subscriber identifier and wherein each computing device is connected to the network, a profile datastore, wherein the profile datastore comprises a subscriber security profile comprising information indicative of a security status of the subscriber and wherein the subscriber security profile is associated with the subscriber's subscriber identifier, and an information processor connected to the network.

The information processor comprises instructions for monitoring subscriber identifiers associated with subscribers who are logged into a website, wherein the website defines a virtual space and the logged-in subscribers are characterized as present in the virtual space, serving web pages to the computing devices of the present subscribers via the network, wherein a web page of a first subscriber comprises a first subscriber icon associated with the first subscriber and subscriber icons of other present subscribers, determining whether the first subscriber security profile matches the subscriber security profile of one or more of the other present subscribers according to security matching criteria, assigning a security attribute to the icons of the other present subscribers having security profiles that match the security profile of the first subscriber according to security matching criteria, and providing selected security profile information to the first subscriber of a selected one of any of the other present matching subscribers.

By way of illustration and not as a limitation, a subscriber computing device may be a desktop computer, a laptop computer, a PDA, a cellphone, or a smartphone.

By way of illustration and not as a limitation, the network may be a wireless network, a wired network, a fiber network, a public network, a private network, or a subscriber network.

By way of illustration and not as a limitation, the subscriber icons may be a geometric shape, an avatar, a shape of an animal, a shape of an object.

By way of illustration and not as a limitation, the profile information may include a security clearance level such as confidential, secret, top secret, and "sensitive compartmented information."

By way of illustration and not as a limitation, an attribute may be a color, a hue, a size, a shape, a sound, flashing, or a periodic change from one attribute to another attribute.

In an embodiment, the virtual space is representative of a real space the web page comprises a graphical depiction of the virtual space. In this embodiment, the information processor further comprises instructions for determining a location of the subscriber computer relative to the real space and the first subscriber icon and the other present subscriber icons are displayed relative to their locations in the real space.

By way of illustration and not as a limitation, the real space may be a building, a "sensitive compartmented information facility" (SCIF), a military base, a nuclear facility, a contractor's facility in which classified information is maintained, or a research facility.

An embodiment comprises a method for secure networking in a virtual space over a network. Subscriber computing devices each operated by a subscriber are associated with a subscriber identifier. Each computing device is connected to the network. A subscriber security profile is created in a security profile datastore, wherein the subscriber security profile comprises information indicative of a security status and wherein the subscriber security profile is associated with the subscriber's subscriber identifier. Subscriber identifiers associated with subscribers who are logged in to a website are monitored. The website defines a virtual space and the logged-in subscribers are characterized as present in the virtual space. A web page is served to the computing devices of the present subscribers via the network. The web page of a first subscriber comprises a first subscriber icon associated with the first subscriber and subscriber icons of other present subscribers. A determination is made whether the first subscriber security profile matches the subscriber security profile of one or more of the other present subscribers according to security matching criteria. An attribute is assigned to the icons of the other present subscribers having security profiles that match the security profile of the first subscriber according to security matching criteria. Selected security profile information is provided to the first subscriber of a selected one of any of the other present matching subscribers.

DESCRIPTION OF THE DRAWINGS

FIG. 1 illustrates the logical elements of a virtual matching system according to an embodiment hereof.

FIG. 2 illustrates a virtual meeting space according to an embodiment.

FIG. 3 illustrates a response to the selection of an attribute icon according to an embodiment.

FIG. 4 illustrates a matching process using a single set of matching criteria according to an embodiment.

DETAILED DESCRIPTION

Figure 5A:
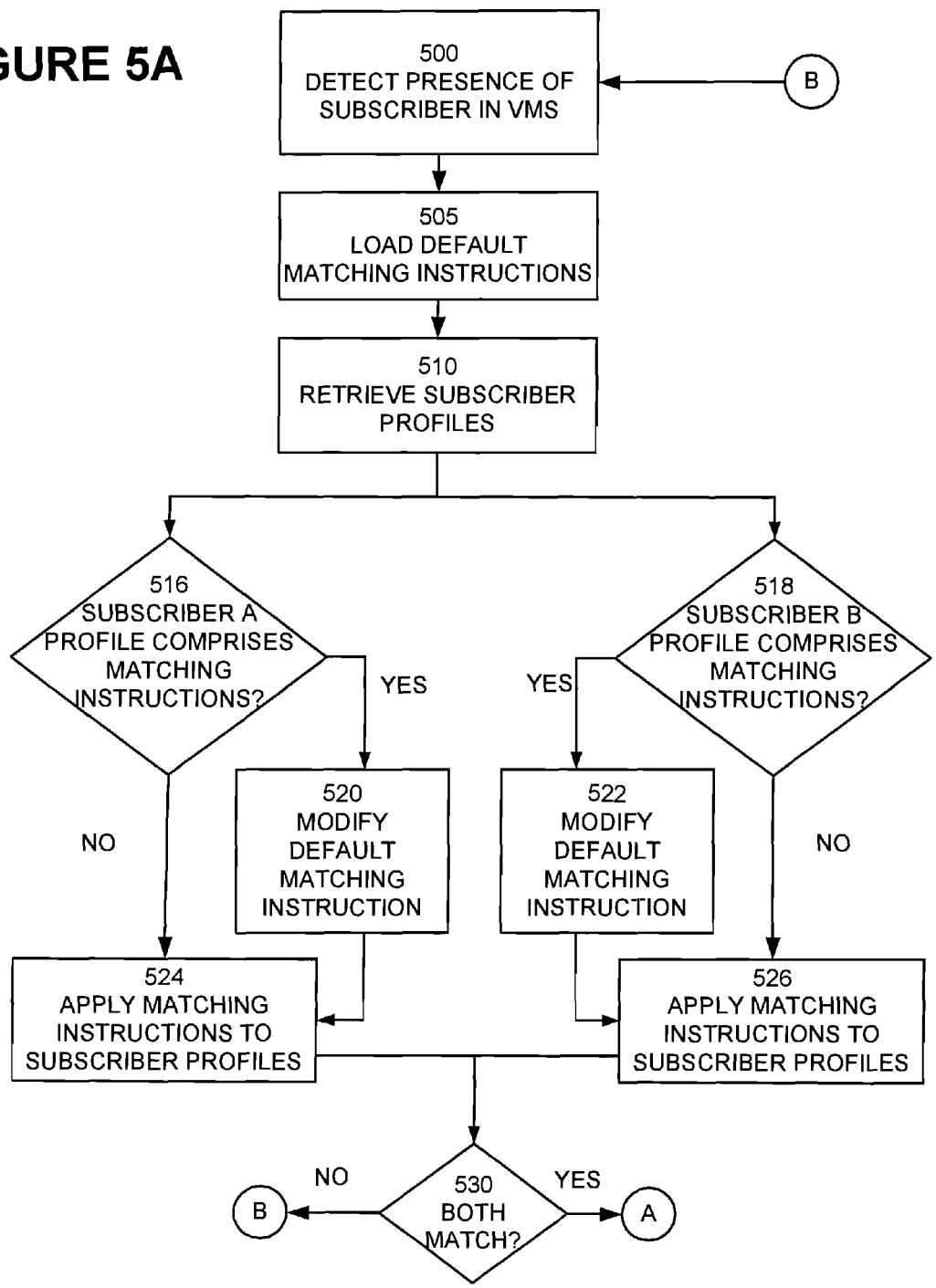
FIGS. 5A and 5B illustrate a matching process in which differing matching criteria are used according to an embodiment.

FIG. 1 illustrates the logical elements of a virtual matching system according to an embodiment hereof. In an embodiment, a virtual meeting space is established over a network in which subscribers may congregate and network for a variety of purposes. In this embodiment virtual meeting space (VMS) server 100 comprises an information processor 114, a subscriber record datastore 120, a communications system 125, subscriber display manager 130, subscriber input manager 135, subscriber login manager 140, and matching data manager 142.

A subscriber computing device 150 comprises subscriber client 155. By way of illustration and not as a limitation, computing device 150 may be a standalone device such as a desktop computer or laptop computer, or it may be a communications device such as a cellular phone, a pager, a personal data assistant, a transponder, a radio, a walkie-talkie, or other mobile device that may communicate via network. Computing device 150 interacts with client 155 via graphical user interface (GUI) 160. By way of illustration and not as a limitation, the computing device may utilize an input device (not illustrated) such as a touch screen, key pad, pointing device, thumbwheel, voice recognition system or similar input mechanisms.

Subscriber client communicates via network 145 with VMS server 100. Network 145 may be the Internet or it may be a limited access network such as a cable network or wireless network. Subscriber client 155 comprises GUI 160 and optional communication system 165.

Subscriber records datastore 120 comprises a subscriber profile for each subscriber associated with a subscriber identifier. By way of illustration and not as a limitation, a subscriber profile comprises characteristic data and preference data. The characteristic data may include age, marital status, physical size, physical limitations, and similar personal information. Preference data, for example, may include information relevant to establishing a business relationship or a social relationship and information related to preferences in food, clothing, sports, entertainment, and music, and information that determines at least in part how the subscriber interacts with other subscribers.

Subscriber profile data may be collected from a subscriber via a computer, a telephone, or via a personal interview. In an embodiment, a subscriber is interviewed and the voice of the subscriber is processed by a voice pattern recognition algorithm to determine whether the answers given by the subscriber are truthful. Detection of stress in a voice pattern algorithm may indicate that a subscriber is lying or that the particular response is a subject of stress for the subscriber that requires further exploration via questions or perhaps human interaction. Users that are not truthful or who may not be able to complete a questionnaire without a stress reaction are not allowed into the system. As will be appreciated by those skilled in the art, other methods of determining the truthfulness or stress of a subscriber may be used as well.

FIG. 2 illustrates a virtual meeting space according to an embodiment. Referring to both FIG. 1 and FIG. 2, a subscriber logs in to VMS server 100 via login manager 140. When a subscriber is logged in, the subscriber is deemed to be "present" in VMS 230. The subscriber is identified to VMS server 100 via the subscriber id associated with the subscriber record stored in subscriber records datastore 120. A subscriber A icon 240 is displayed within VMS 230 to computing device 205 indicating that the subscriber using computing device 205 is present in the space. A subscriber icon B 250 is displayed within VMS 230 to computing device 210 indicating that the subscriber using computing device 210 is present in the space. As will be described below, the placement and movement of subscriber A icon 240 and subscriber B icon 250 is in various embodiments under the control of the subscriber associated with the particular icon. In an embodiment, subscriber A icon 240 is visible to subscriber A but not to subscriber B and subscriber B icon 250 is visible to subscriber B but not to subscriber A. In other embodiments, the visibility of icons associated with other users is under the control of the viewing subscriber. In these embodiments, the viewing subscriber may cause other icons to be visible, to be visible in a diminished way so as to indicate presence, or to be visible only when the other subscriber icons are "icons of interest" as described below. In still another embodiment, when a subscriber logs off or turns the computer off, the respective subscriber icon will disappear from the display of other subscribers. Subscriber icons may appear as avatars, animals, or inanimate objects in order to add further interest to the VMS 230. Further these shapes may change based on the circumstances of any meeting. Thus a subscriber may wish to change its avatar as a meeting progresses so that symbols and shapes can change as more information is exchanged between subscribers.

In an embodiment, a subscriber may define the geographical boundaries of the virtual meeting space, either by establishing a preference in subscriber records datastore 120 or by providing geographical boundaries to subscriber input manager 135 via GUI 160. By way of illustration and not as a limitation, a geographical boundary may be established using country, county, or city names, by providing a zip or postal codes, by providing a radial distance from a location point, or other means. In an embodiment, VMS server 100 reports the number of other subscribers in the space chosen by the subscriber to allow the subscriber to expand or contract the space size. In yet another embodiment, the subscriber may select a location point and request that the space size be adjusted from the location to point to include a preferred number of other subscribers.

As illustrated in FIG. 2, the boundary of VMS 230 is arbitrary. However, this is not meant as a limitation. In other embodiments, the boundary of VMS 230 may be defined and represented by a bounded space that is related to a real (non-virtual) space. In this embodiment, the shape of VMS 230 may correspond to the shape of the bounded space or may be associated with its real space analog by reference points in the real space. For example, the boundary of VMS 230 may be a scaled map of a state, a city, a neighborhood or the like or it may provide location and distance information to relate subscribers to each other or a subscriber to a physical location within the real space.

In an embodiment, a subscriber login manager 140 requests location information from the subscriber. By way of illustration and not as a limitation, a subscriber may enter a zip or postal code, an address, map coordinates, or longitude and latitude values to identify a current location of the subscriber.

Figure 6:
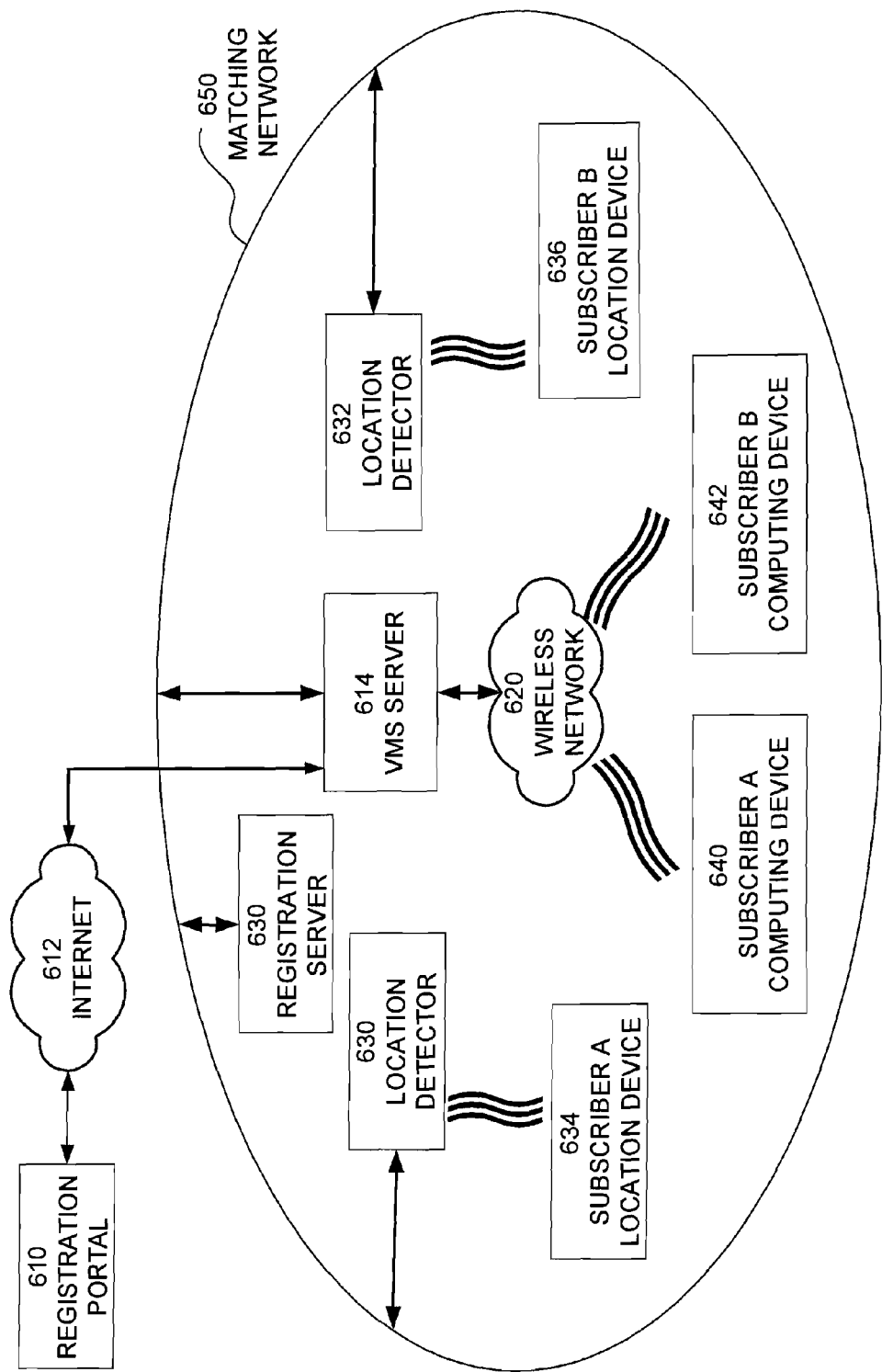
FIG. 6 illustrates a matching network 650 located within a bounded space according to an embodiment.

In another embodiment, the subscriber is physically present in a real space that is represented by a bounded space and the actual location of a subscriber relative to the bounded space may be determined from data provided by the subscriber or by acquisition of location data by automated means. FIG. 6 illustrates a matching network 650 located within a bounded space (not illustrated) according to an embodiment. Subscribers may be pre-registered with VMS server 614 or may register at registration portal 610 before joining the matching network 650. In one embodiment and as illustrated in FIG. 6, a subscriber may register using registration portal 610 via the Internet 612 use a registration server 630 connected to VMS server 614 via matching network 650.

Subscriber A is associated with location device 634. Subscriber B is associated with location device 636. By way of illustration and not as a limitation, location devices 634 and 636 may be Blue Tooth-based devices, WiFi-based devices, GPS-based devices, or RFID-based devices. Location devices may be permanently assigned to a subscriber or assigned when the subscriber arrives at the bounded space.

Location devices 634 and 636 are tracked within the real space that is represented by the bounded space by location detectors 630 and 632. Location information to VMS server 100. By way of illustration and not as a limitation, the location device utilized by the subscriber may be an RFID-enabled device, a Blue-Tooth-enabled device, a GPS-enabled device, or similar device. While only two location detectors 630 and 632 are illustrated, this is not meant as a limitation. It is anticipated that a real space that is represented by a bounded space will have number location detectors to detect both the location of a subscriber and a direction in which the subscriber/shopper may be moving over time. Various technologies, including signal strength measures and triangulation may be used to determine the location of a subscriber relative to the location detectors 630 and 632.

The VMS server 632 communicates with subscriber computing device 640 and 642 via wireless network 620. As will be describe below, in this embodiment, the VMS server 632 uses the wireless network 620 to send match alert signals to computing device 640 and 642.

Referring again to FIG. 1 and FIG. 2, the location of a subscriber icon (240, 250) may be depicted on a subscriber computing device relative to a graphical representation of a virtual meeting space. If the virtual meeting space is a bounded space, the graphical representation of the bounded space may be representative of the shape of the bounded space and, optionally, drawn to scale. As will be described below, the subscriber icons (240, 250) may be moved within the virtual meeting space so as to facilitate an exchange of information.

In an embodiment, a subscriber may interact with a bounded space via subscriber input manager 135 to zoom or pan the scaled depiction of the bounded space so as to place the subscriber icon in the bounded space in a location that is analogous to a location in a real space represented by the bounded space.

In another embodiment, the bounded space may be a building or a meeting room. In this embodiment, VMS 230 may be further divided into sub-spaces 260 such as landmarks, rooms, and cubicles.

The presence of a subscriber in VMS 230 allows the subscriber to interact with VMS 230 and other subscribers. By way of example and not as a limitation, a subscriber A uses computing device 205 to login to VMS server 100. In this example, VMS 230 is described from the perspective of subscriber A. Other subscribers would experience similar interactions with VMS 230. In this example, a subscriber B uses computing device B 210 to login to VMS server 100. In this embodiment, subscriber A and B have each defined a VMS that at least encompasses VMS 230. Subscriber A and B are each present in VMS 230 as indicated by subscriber icons 240, 250.

In addition to the subscriber A icon 240, under conditions described below subscriber display manager 130 causes a match indicator 242 to be displayed on the served web page sent to computing device A 205 and a match indicator 252 to be displayed to on the served web page sent to computing device 210. In an embodiment, a match indicator is a graphic generated by subscriber display manager 130. Match indicators 242 and 252 may take any form that conveniently indicates the status of a match. In an embodiment, the graphical representation of match indicators 242 and 252 is user definable. As noted above, individual subscribers are free to represent themselves as any avatar they desire and that avatar can change its size and shape depending upon the match that is occurring and how the individual wants to be presented to another person.

Match indicator 242 associated with subscriber A comprises an attributes icon 244 and a profile data icon 246. Match indicator 252 associated with subscriber B comprises an attributes icon 254 and a profile data icon 256. Attributes icon 244 as seen by subscriber A links to information of a subscriber that "matches" the profile information provided by subscriber A. For example, attributes icon 244 may link to information about subscriber B.

Attributes icon 254 as seen by subscriber B links to information of a subscriber that "matches" the profile information provided by subscriber B. For example, attributes icon 254 may link to information about subscriber A.

Profile data icon 244 provides a link to information about another subscriber present in VMS 230 which may be subscriber B. Profile data icon 254 provides a link to information about another subscriber present in VMS 230 which may be subscriber A. Match indicator 242 is only presented to subscriber A. That is, subscriber B will also see a matching indicator (252) but the content conveyed by the matching indicator 252 served to computing device B 210 will be different from the content of match indicator 242.

Referring again to FIG. 1, login manager 140 establishes the presence of all subscribers in VMS 230. Login manager sends a presence signal comprising a subscriber identifier of each present subscriber to information processor 114.

In an embodiment, information processor 114 comprises a set of "default" instructions that determine how the profile information of subscriber A and subscriber B as reflected in subscriber records datastore 120 is to be related or "matched" to other present subscribers. For example, using subscribers A and B as examples, the default matching instructions may require that a match will be determined only if the age difference between subscriber A and subscriber B is ten years or less.

Other more complex matches are within the scope of the various embodiments and may be multi-dimensional in nature leading to a "score" related to compatibility of the match. That is, a "match" between the profiles of subscriber A and subscriber B is quantitatively determined. In this embodiment, the default matching instructions produce a total matching score by assigning values to specific matching criteria. As described below, the default matching criteria and the weight assigned to a specific criterion may be modified by the subscriber in establishing the subscriber records datastore 120.

In an embodiment, when a determination is made that matching scores of subscribers A and B are within an acceptable range or exceed a predetermined threshold, a match alert signal is sent from the information processor 114 to subscriber display manager 130. The match alert signal may comprise audio information, video information, textual information, and graphical information. Additionally, the match alert signal may provide location information of a subscriber where a "match" is present or provide directions to the location of a subscriber with whom a "match" exists. Matching data manager 142 keeps track of matching data for each subscriber.

Again describing the process from the perspective of subscriber A, in an embodiment, the match alert signal is passed by subscriber display manager 130 to match indicator 242. The match alert signal affects the behavior of the subscriber icons 240 and 250. In an embodiment, the subscriber B icon 250 becomes visible to subscriber A, as will the icons of other subscribers that have been identified as meeting the threshold criteria for a match (herein, "subscribers of interest"). In another embodiment, the display of the matching subscriber icons is indicative of the match score. For example, the highest scores may flash, be larger in size, be displayed with a color or hue or intensity, or any combination of such indicators. Additionally, a subscriber icon may display a number indicative of the score associated with the subscriber by the information processor 114.

Again from the perspective of subscriber A, when information processor 114 determines that the profiles of subscriber A and B "match," the match indicator 242 is visible to subscriber A. In an embodiment, the match indicator becomes visible to subscriber A when subscriber A moves subscriber A icon 240 into proximity to subscriber B icon 250. Alternatively, match indicator 242 is visible to subscriber A when subscriber A moves a cursor to the subscriber B icon 250.

Match indicator 242 responds by presenting attributes icon 244 and profile data icon 246 to subscriber A. Attributes icon 244 is linked to matching data manager 142. When selected by subscriber A, attributes icon presents a brief summary of the attributes of subscriber B, subscriber B's matching score, and other general information. In an embodiment, the detail presented when the attributes icon is selected may be conditioned on permissions granted by subscribers whose information is being requested. Thus, a subscriber may allow a photograph to be displayed and the matching score. Alternatively, a subscriber may allow only non-identifying information to be disclosed. In yet another embodiment, subscriber A may establish preferences as to when attributes icons are displayed. Thus, the attributes icon may be automatically selected when the match indicator 242 is displayed.

When profile data icon 246 is selected by subscriber A, a request for profile data of subscriber B is conveyed to VMS server 100. In an embodiment, the presentation of profile data of one subscriber to another subscriber is conditioned on permissions granted by subscribers whose information is being requested. For example, subscriber B may elect to withhold all profile information from other subscribers, provide a limit set of profile information if the matching score exceeds a subscriber-defined threshold, or provide all profile information without restrict.

In an embodiment, the selection of profile data icon by subscriber A causes information processor 114 to send a request message to subscriber B for release of profile information to subscriber A. The message may be conveyed to GUI 160 (FIG. 1) residing on subscriber computing device 210 (FIG. 2) as a text or audio message, an instant message, or a message produced using other network protocols.

Alternatively, the request message may be relayed through communications system 125 (FIG. 1) via network 145 (FIG. 1) to communications system 165 (FIG. 1) operating on client 155 (FIG. 1) of subscriber computing device 210 (FIG. 2) or to an external communications device (not illustrated) selected by subscriber B. By way of illustration and not as a limitation, communications system may utilize VoIP, SMS, or e-mail. The message may be sent to computing device 210 or an external device such as a cell phone, a PDA, or similar communications device.

Subscriber B may decline the request message. If this occurs, information processor 114 causes a decline message to be sent to subscriber A as previously described in the context of the communication of the request message to subscriber B. Additionally, subscriber display manager 130 changes the appearance of subscriber B icon 250 to indicate a lack of interest on the part of subscriber B.

Subscriber B may accept the request message and release the subscriber B profile data to subscriber A. Concurrently, subscriber B receives the profile data of subscriber A. The transfer of profile data also prompts information processor 114 to send a contact invitation to both subscriber A and subscriber B. In an embodiment, both subscriber A and subscriber B must accept the contact invitation before the contact information is shared. The contact invitation may also include an offer to establish communications using communications system 125 as previously described in the context of the communication of the request message to subscriber B.

In an embodiment, communications system 125 causes a chat screen to open up allowing the individual users to chat with one another. If the chat session appears to be one that shows further affinity between the individuals, each individual can permit their picture to be displayed in association with the chat that is occurring. In this sense, the individual uses control at the level of personal information that is exchanged between one another assuming that an appropriate match level is achieved.

At another level, if an appropriate match level is achieved, an audio link can be opened between two individuals allowing those individuals to verbally chat with one another and exchange additional information. Part of any such audio chat can be a voice stress analyzer that can display for either user any stress in speech patterns that would be indicative of lying on the part of the speaker. The voice stress analysis can be run by the server, thereby providing a visual indication to the individual users when one or the other is not telling the truth. This audio link can be facilitated over any number of channels. If both users register as having, for example, a Skype connection, the voice channel can be open between the two individuals using the Skype system. Similarly any other audio system capability that might exist between the two computers can be registered and then utilized for voice communication.

In an embodiment, subscriber A may place a contact invitation on "hold" for a fixed period of time to allow subscriber A to determine whether other subscribers are of equal or greater interest to subscriber A than subscriber B.

The default matching instructions may be modified by a preference setting in a subscriber profile stored in the subscriber records datastore 120. For example, if subscriber A's profile requires that the age difference not exceed two years, the default matching instructions will be modified to use the age criterion of subscriber A's profile.

FIG. 3 illustrates a response to the selection of an attribute icon according to an embodiment.

In another embodiment, when attributes icon 244 is selected by subscriber A, subscriber display manager 130 causes a subscriber of interest profile summary 310 as previously described and action list 320 to appear on a web page 300 being served to subscriber A. Action list 320 comprises selection icons that may be selected by subscriber A. If action icon 320A is select, a profile request is sent to information processor 114 as previously described. If action icon 320B is select, subscriber A may request that subscribers of interest be further filtered using a set of "auxiliary" matching criteria stored in subscriber A's profile record. By also selection action icon D1 or D2, subscriber A may request that the auxiliary criteria be only applied to the current subscriber of interest (320D1) or to all subscribers of interest (320D2).

Subscriber A may also select action icon 320C1. Action icon 320C1 comprises a list of selectable matching criteria that can be individually selected and to sent to information processor 114 by subscriber A. By also selection action icon D1 or D2, subscriber A may request that the auxiliary criteria be only applied to the current subscriber of interest (320D1) or to all subscribers of interest (320D2).

In circumstances where the default matching instructions have been modified by a subscriber, the matching attribute values may be different for subscribers A and B depending on whether one or both of the users' profiles has matching instructions or if either or both users determine the matching value at their respective match indicators. Thus subscriber A's match indicator may inform subscriber B that subscriber A is a match (color) but qualitatively low in terms of scoring (hue and saturation). Subscriber B's match indicator may inform subscriber A that subscriber B is a qualitatively good match.

FIG. 4 illustrates a matching process using a single set of matching criteria according to an embodiment. For ease of discussion and not as a limitation, the description that follows applies the matching process to a subscriber A and a subscriber B.

The presence of subscribers A and B is detected in the VMS 400. Default matching instructions are loaded into an information processor 405. The subscriber ids of subscriber A and B are used to retrieve the profiles of subscribers A and B are retrieved 410. A determination is made whether the profile of a subscriber comprises matching criteria 415. If no subscriber matching criteria are found, the default matching instructions are applied 425 to the subscriber profiles of subscribers A and B. If one or more of the subscriber profiles comprises auxiliary matching criteria, the default matching instructions are modified using the most restrictive of the auxiliary matching instructions 420.

A determination is made whether the profiles of subscriber A and B "match" 430 according to the matching instructions. If a match is found, match alert signals as described above are sent to the subscribers' match indicators 440. Subscriber display manager 130 causes subscriber B icon to be displayed on the web page served to subscriber A and subscriber A icon to be displayed on the web page served to subscriber B. If no match is found, the process returns to detecting the presence of subscribers in the VMS 400.

Figure 5B:
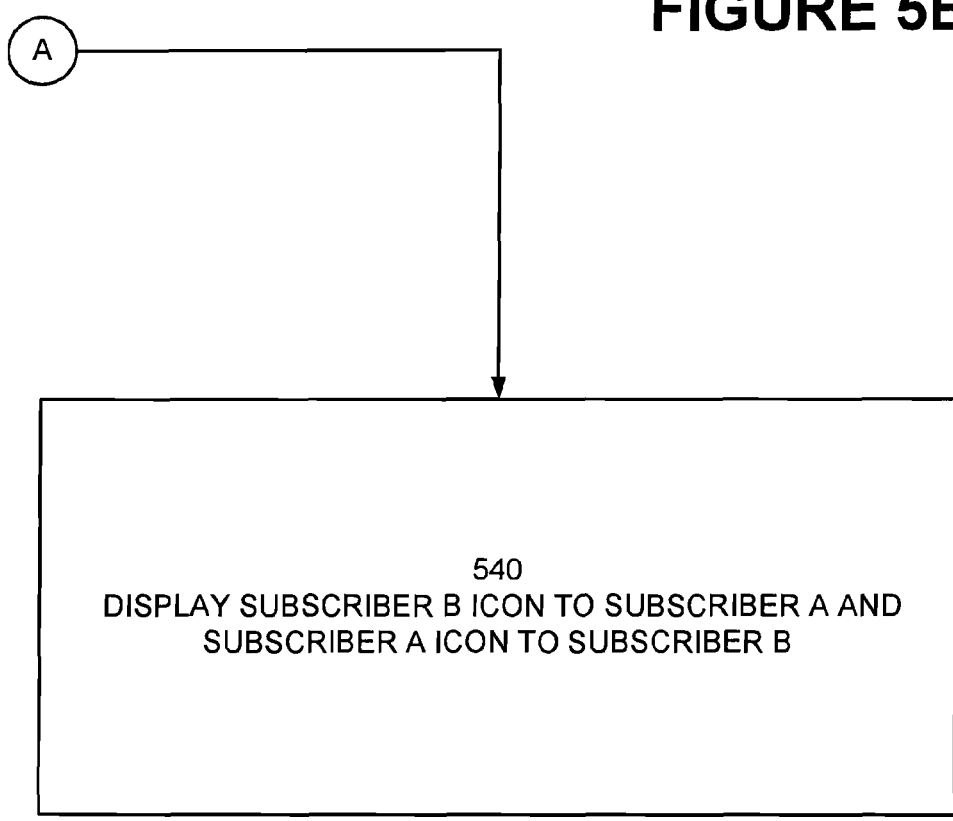

FIGS. 5A and 5B illustrate a matching process in which differing matching criteria are used according to an embodiment. For ease of discussion and not as a limitation, the description that follows applies the matching process to a subscriber A and a subscriber B.

Referring to FIG. 5A, the presence of subscribers A and B is detected in the VMS 500. Default matching instructions are loaded into an information processor 505. The subscriber ids of subscriber A and B are used to retrieve the profiles of subscribers A and B are retrieved 510. A determination is made whether the profile of subscriber A comprises auxiliary matching instructions 516. If so, the default matching instructions are modified 520. The default matching instructions or the matching instructions as modified by the auxiliary matching instructions are applied to the profile information of subscribers A and B 524.

A determination is made whether the profile of subscriber B comprises auxiliary matching instructions 518. If so, the default matching instructions are modified 522. The default matching instructions or the matching instructions as modified by the auxiliary matching instructions are applied to the profile information of subscriber B 526.

A determination is made whether the profiles "match" according to the matching instructions applied by both subscriber A and subscriber B 530. If both do not match, the process returns to detecting the presence of subscribers in the VMS 500. If both match, subscriber display manager 130 causes subscriber B icon to be displayed on the web page served to subscriber A and subscriber A icon to be displayed on the web page served to subscriber B.

In an embodiment, a matching system is implemented at an event, such as a trade show, in which a large number of attendees pre-register. During the registration process, profile information is acquired from potential attendees. This profile information may be used to provide the potential attendee an initial indication of whether persons or vendors of interest will be in attendance at the event. Following registration but prior to the commencement of the event, the registered attendees may be pre-matched according to default matching instructions. Upon the commencement of the event, the presence of the registered attendees is determined.

In another embodiment, the location of attendees is determined using location devices previously described. The relative location of matching attendees is then reflected in the graphical depiction of the trade show venue on the subscriber's computing device. As attendees with matching profiles come into proximity with one another, match alert signals are provided as appropriate to the computing devices operated by the attendees.

In another embodiment, a determination is made whether a pre-registered attendee has modified his or her profile information since registering. If the profile has been modified, the matching process is re-run using the updated information. Additionally, the matching process is run on attendees who did not pre-register.

The behavior of the matching elements may vary depending on whether the profile information is associated with an individual representing a personal interest or an individual representing a commercial interest. For example, in the case of an event in which the primary objective is to introduce individuals for social purposes, it might be desirable to provide an individual control over the disclosure of their personal information, location, and contact information. In this application, an acknowledgement of a match alert signal by both of the match users may be desirable prior to initiation of the exchange of information.

In the case where the objective is to match an individual with a product or product information, such as a booth at a trade show, the matching data may be sent to the subscriber's computing device in real time without the need for a profile request. For example, a subscriber's computing device may be alerted when the subscriber arrives at the trade show venue and alerted again when the subscriber is in proximity to a display booth that matches the subscriber's profile.

The applications to which a matching system incorporating a matching indicator may be directed are numerous. The distinction between them lies primarily in the types of data provided in the profile/preference data associated with the subscriber clients and used to perform the matching process and the way in which the matching information is conveyed to users. The examples that follow assume that users are present within the virtual meeting space (VMS).

In an application, a matching system operates in a shopping mall. Referring again to FIGS. 1, 2 and 6, a subscriber/shopper creates a profile on the information processor 114 that is stored in subscriber records datastore 120. The subscriber/shopper may create his or her profile before arriving at the mall using a registration portal 610, or the subscriber/shopper may utilize a registration server 630 operating at the mall. The subscriber's profile comprises a shopping list of items that the subscriber/shopper is interested in purchasing. In this application, subscriber records 120 include a record for each merchant identifying items that a merchant located within the mall desires to sell. For example, the merchant record may include items that merchants have on special or the entire inventory of one or more merchants. Information processor 114 operates matching instructions that determine if there is a match between the shopping list of the subscriber/shopper and the items identified by the merchants within the mall.

The location of the subscriber/shopper within the mall is detected by a location detector 130. If a match has been determined, a match alert signal is sent to the subscriber computing device 150 indicating that items of interest to the shopper may be located at a list of merchants. The match alert signal may, for example, identify the items on the shopping list of subscriber/shopper that match the inventories of various merchants within the mall. The subscriber's computing device would also illustrate the shopper's location within the mall and the location of the merchants having items of interest. The shopper proceeds to a merchant identified in the match alert signal.

Referring again to FIG. 6, the location of the subscriber/shopper within the mall is determined by reference to the location of the location detector 630 that has detected the presence of subscriber A location device 634 that is associated with subscriber A computing device 640.

While only two location detectors 630 and 632 are illustrated, this is not meant as a limitation. It is anticipated that a bounded space will have a number of location detectors to detect both the location of a subscriber and a direction in which the subscriber/shopper may be moving over time.

In an embodiment, a match alert signal may be sent to a computing device of a subscriber/merchant when the subscriber/shopper is in proximity to an item on the shopper's list. The computing device of the subscriber merchant may act on the match alert signal to enhance the shopping experience of the subscriber/shopper and to increase the chances that subscriber/shopper will make a purchase. By way of illustration, the computing device of the subscriber/merchant may cause a message to be displayed on the computing device of the subscriber/shopper offering a particular item, offering a coupon, or offering a sales price. The computing device of the subscriber/merchant may additionally or alternatively cause a physical display device to provide a message to the subscriber/shopper.

In an embodiment, the messaging of the subscriber/shopper by the subscriber/merchant may be affected by the preferences of the subscriber shopper. The preferences of the subscriber/shopper may block any messages from a subscriber/merchant, may allow messages to the computing device of the subscriber/shopper but not to a physical display, and may allow only a shopper's nickname to be provided to the subscriber/merchant in the event of a match and for display on a physical device.

In another implementation, a matching system is operated in a social club in which individuals desiring to meet other individuals congregate.

Referring again to FIGS. 1, 2 and 6, subscribers A and B create profiles on information processor 114 that is stored in subscriber records datastore 120. The subscriber may create his or her profile before arriving at the social club using a registration portal 610, or the subscriber/shopper may utilize a registration server 630 operating at the social club. As previously described, the subscribers' profiles are stored in subscriber records 120. Information processor 114 operates matching instructions that determine if there is a match between the profiles of subscriber A and subscriber B as previously described.

In this implementation, subscriber A is associated with subscriber A computing device 640 and subscriber A location device 634. Subscriber B is associated with subscriber B computing device 642 and subscriber A location device 636. Matching instructions are applied to the subscriber profiles of subscriber A and subscriber B and a match is found. The match alert signal is passed by VMS server 632 to subscriber A computing device 640 and subscriber B computing device 642. The computing devices display the location of subscriber A icon (FIG. 2, 240) and the location of subscriber B icon (FIG. 2, 250) relative to the bounded space as previously described. Match indicators A and B (FIGS. 2, 242 and 254 respectively) are also displayed. In an embodiment, when subscriber A is in proximity to two potential matches, only the subscriber icon of the "best" match will be displayed.

In yet another implementation, the bounded space is a trade show. Referring again to FIGS. 1, 2 and 6, a subscriber/attendee creates a profile on the information processor 114 that is stored in subscriber records datastore 120 that indicates areas of interest of the attendee. For example, an attendee may be interested in information about a product, a company, or a person associated with a company. The subscriber/attendee may create his or her profile before arriving at the mall using a registration portal 610 or the subscriber/attendee may utilize a registration server 630 operating at the mall. In this application, subscriber records 120 include a record for each presenter identifying information about products, services, technology and the like that a presenter located within the trade show is offering. Information processor 114 (see FIG. 1) operates matching instructions that determine if there is a match between the interests of the subscriber/attendee and the information offered by the presenters at the trade show.

If a match between the profile of a subscriber/attendee and a subscriber/presenter has been determined, a match alert signal is sent to the subscriber computing device 150 (FIG. 1) indicating that items of interest to the attendee may be located at a list of presenters. The match alert signal may, for example, identify the items on the interest list of subscriber/attendee that match the products, services, or information content of the presenters. The subscriber's computing device would also illustrate the attendee's location within the trade show venue the locations of the presenters having items of interest. The location of an attendee of a trade show within the trade show is determined by reference to the location of the location detector 630 that has detected the presence of subscriber/attendee A location device 634 and is associated with subscriber A computing device 640. A presenter is associated with computing device B 642.

While only two location detectors 630 and 632 are illustrated, this is not meant as a limitation. It is anticipated that a bounded space will have a number location detectors to detect both the location of a subscriber and a direction in which the subscriber/attendee may be moving over time.

In an embodiment, a match alert signal may be sent to a computing device of a subscriber/presenter when the subscriber/attendee is in proximity to the display area of the subscriber/presenter. The computing device of the subscriber/presenter may act on the match alert signal to enhance the experience of the subscriber/attendee and to increase the chances that subscriber/attendee will make contact. By way of illustration, the computing device of the subscriber/presenter may cause a message to be displayed on the computing device of the subscriber/attendee offering a presentation, a product sample or a gift. The computing device of the subscriber/presenter may additionally or alternatively cause a physical display device to provide a message to the subscriber/attendee.

In an embodiment, the messaging of the subscriber/attendee by the subscriber/presenter may be affected by the preferences of the subscriber attendee. The preferences of the subscriber/attendee may block any messages from a subscriber/presenter, may allow messages to the computing device of the subscriber/attendee but not to a physical display, and may allow only a attendee's nickname to be provided to the subscriber/presenter in the event of a match and for display on a physical device.

In another implementation, a matching system is operated in a secure environment. In such an environment, it is very important for individuals who work in a classified environment to understand and have knowledge of the clearance level of those they may wish to discuss different matters. It is axiomatic in the classified world that one cannot discuss classified matter with another, unless there is a specific need to know. That need to know is reflected by different security clearance levels. There is also the case that there may be many hundreds of individuals who have appropriate clearances that match one another, yet those individuals will not personally know one another and therefore will not be able to discuss any classified matters. In the embodiment, the bounded space is represented as a secured meeting room in which individuals may establish secured communication links between one another in the event that there is an attribute match.

In an exemplary embodiment, a match indicator is used to facilitate a security system. A security clearance is a status granted to individuals allowing them access to classified information, for example, state and corporate secrets. The term "security clearance" as used herein is a formal process to vet employees for access to sensitive information. A clearance by itself is normally not sufficient to gain access. The organization must determine that the cleared individual has a "need to know" for the information. No one is supposed to be granted access to classified information solely because of rank, position, or a security clearance.

A security clearance is generally granted to a particular level of clearance. For example, a security system may establish a ranked classification system (from least sensitive to most sensitive) of confidential, secret, top secret, and sensitive compartmented information. At higher level clearances "compartments" represent groups of information that are necessarily separated from each other in content and possibly organizationally as well (although not necessarily so). Thus an individual with access to one compartment of information will not necessarily have a "need-to know" and hence access to another compartment of information. Each compartment may include its own additional clearance process. Such compartmentalized clearances may be expressed as "John has a TS/SCI TK/Q clearance", where all clearance descriptors are spelled out verbally. Certain government departments may also establish special access programs (SAP) when the risk of loss associated with certain information is exceptionally grave.

Therefore, in this embodiment, the profile information of a subscriber may, for example, comprise a security clearance level, such as confidential, secret, and top secret, and may further comprise and compartments as described above.

Referring again to FIGS. 1 and 2, subscribers A and B create profiles on information processor 114 that are stored in subscriber records datastore 120. By way of illustration and not as a limitation, a subscriber profile comprises a security clearance level and security compartment. The compartment may be project specific and is indicative of a need to know information about a particular classified matter.

As previously described, the subscribers' profiles are stored in subscriber records 120. When a subscriber logs in to VMS server 100 via login manager 140, the subscriber is deemed to be "present" in VMS 230. The subscriber is identified to VMS server 100 via the subscriber id associated with the subscriber record stored in subscriber records datastore 120. A subscriber A icon 240 is displayed within VMS 230 to computing device 205 indicating that the subscriber using computing device 205 is present in the space. A subscriber icon B 250 is displayed within VMS 230 to computing device 210 indicating that the subscriber using computing device 210 is present in the space. In this embodiment network 145 may be a wired network, a wireless network, a fiber network, a secure wired network, a secured wireless, and a secured fiber network.

The placement and movement of subscriber A icon 240 and subscriber B icon 250 is as previously described. In an embodiment, subscriber A icon 240 is visible to subscriber A but not to subscriber B and subscriber B icon 250 is visible to subscriber B but not to subscriber A. In other embodiments, the visibility of icons associated with other users is under the control of the viewing subscriber. In these embodiments, the viewing subscriber may cause other icons to be visible, to be visible in a diminished way so as to indicate presence, or to be visible only when the other subscriber icons are "icons of interest" as described below. Information processor 114 operates matching instructions that determine if there is a match between the profiles of subscriber A and subscriber B as previously described.

In this implementation, the attribute match does not necessarily reveal any personal information, but simply reveals organizational and clearance level information. Thus, if an individual wishes to chat about his or her specific project with another person of the same security clearance level, icons can similarly be moved next to one another or links drawn from one icon to another that will show the affinity between those two icons. That affinity can be illustrated as a color change or some other graphical indication as previously described.

In this security clearance instance, when two icons have attributes that match in such a way that communication is permitted in accordance with security clearance regulations, links can be established over classified communications capabilities, such that individuals can chat with one another, establish audio links, or visual links assuming that the appropriate security clearance attributes are present. Additionally, the attributes associated with the security clearance, can allow communications links that are appropriate to that clearance level to be opened. In this fashion individuals who are in a meeting room that is associated with a classified project can be assured that their communication is over an appropriate communication link that is managed by a security server, thereby avoiding the compromise of classified information. In addition, information processor 114 may cause a log of all interactions in the "meeting room" to be stored in subscriber records datastore 120.

In an embodiment, the "meeting room" is bounded space that is related to a real (non-virtual) space. In this embodiment, the bounded space may be a building, a series of "sensitive compartmented information facility" (SCIF), a military base, a nuclear facility, a contractor's facility in which classified information is maintained, and a research facility, and any other location at which classified information may be located and/or discussed.

It will also be understood that the invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A system for secure networking in a virtual space comprising:
   a network;
   subscriber computing devices, wherein the subscriber computing device is associated with a subscriber identifier and wherein each computing device is connected to the network;
   a profile datastore, wherein the profile datastore comprises a subscriber security profile comprising information indicative of a security status of a subscriber and wherein the subscriber security profile is associated with the subscriber's subscriber identifier;
   an information processor connected to the network, wherein the information processor comprises instructions for:
      monitoring subscriber identifiers associated with the subscriber devices that are logged into a website, wherein the website defines a virtual space and the logged-in subscriber devices are characterized as present in the virtual space;
      serving web pages to the computing devices of the present subscribers via the network, wherein a web page of a present subscriber comprises a subscriber icon associated with the present subscriber and subscriber icons of other present subscribers;

determining whether a subscriber security profile associated with the present subscriber matches the subscriber security profiles associated with the other present subscribers according to security matching criteria (herein, the "security matching determination");

in response to the security matching determination, linking the icon of the present subscriber to the icons associated with other present subscribers having security profiles that match the security profile of the subscriber according to the security matching criteria and assigning a security attribute to the icons associated with the other present subscribers having security profiles that match the security profile of the present subscriber according to security matching criteria; and providing selected security profile information to the present subscriber of a selected one of any of the other present matching subscribers.

2. The system of claim 1, wherein the subscriber computing devices are selected from the group consisting of a desktop computer, a laptop computer, a PDA, a cellphone, and a smartphone.

3. The system of claim 1, wherein the network is selected from the group consisting of a wired network, a wireless network, a fiber network, a secure wired network, a secured wireless, and a secured fiber network.

4. The system of claim 1 wherein the icon of the present subscriber and the icons of the other present subscribers are selected from the group consisting of a geometric shape, an avatar, a shape of an animal, and a shape of an object.

5. The system of claim 1, wherein the profile information comprises a security clearance level selected from the group consisting of confidential, secret, top secret, and "sensitive compartmented information."

6. The system of claim 1, wherein the attribute is selected from the group consisting of a color, a hue, a size, a shape, a sound, flashing, and a periodic change from one attribute to another attribute.

7. The system of claim 1, wherein the virtual space is representative of a real space and wherein the web page comprises a graphical depiction of the virtual space.

8. The system of claim 7, wherein the information processor further comprises instructions for determining a location of the subscriber computing devices relative to the real space and wherein the icon of the present subscriber and icons of the other present subscribers are displayed relative to their locations in the real space.

9. The system of claim 7, wherein the real space is selected from the group consisting of a building, a "sensitive compartmented information facility" (SCIF), a military base, a nuclear facility, a contractor's facility in which classified information is maintained, and a research facility.

10. The system of claim 7, wherein computing devices are wireless devices, the network is a wireless network, and the present subscriber and the other present subscribers are physically located in the real space.

11. A method for secure networking in a virtual space over a network comprising:

associating subscriber computing devices with subscriber identifiers, wherein each computing device is connected to the network;

creating a subscriber security profile in a profile datastore, wherein the subscriber security profile comprises information indicative of a security status of a subscriber and wherein the subscriber security profile is associated with the subscriber's subscriber identifier;

monitoring subscriber identifiers associated with the subscriber devices that are logged in to a website, wherein the website defines a virtual space and the logged-in subscriber devices are characterized as present in the virtual space;

serving web pages to the computing devices of the present subscribers via the network, wherein a web page of a present subscriber comprises a subscriber icon associated with the present subscriber and subscriber icons of other present subscribers;

determining whether a security profile associated with the present subscriber matches the subscriber security profiles associated with the other present subscribers according to security matching criteria (herein, the "security matching determination");

in response to the security matching determination, linking the icon of the present subscriber to the icons associated with other present subscribers having security profiles that match the security profile of the subscriber according to the security matching criteria and assigning a security attribute to the icons of the other present subscribers having security profiles that match the security profile of the present subscriber according to security matching criteria; and providing selected security profile information to the present subscriber of a selected one of any of the other present matching subscribers.

12. The method of claim 11, wherein the subscriber computing devices are selected from the group consisting of a desktop computer, a laptop computer, a PDA, a cellphone, and a smartphone.

13. The method of claim 11, wherein the network is selected from the group consisting of a wired network, a wireless network, a fiber network, a secure wired network, a secured wireless, and a secured fiber network.

14. The method of claim 11, wherein the icon of the present subscriber and the icons of the other present subscribers are selected from the group consisting of a geometric shape, an avatar, a shape of an animal, and a shape of an object.

15. The method of claim 11, wherein the profile information comprises a security clearance level selected from the group consisting of confidential, secret, top secret, and "sensitive compartmented information."

16. The method of claim 11, wherein the attribute is selected from the group consisting of a color, a hue, a size, a shape, a sound, flashing, and a periodic change from one attribute to another attribute.

17. The method of claim 11, wherein the virtual space is representative of a real space and wherein the web page comprises a graphical depiction of the virtual space.

18. The method of claim 17 further comprising:

determining a location of the subscriber computing devices relative to the real space; and displaying the icon of the present subscriber and the icons of the other present subscribers relative to their locations in the real space.

19. The method of claim 17, wherein the real space is selected from the group consisting of a building, a "sensitive compartmented information facility" (SCIF), a military base, a nuclear facility, a contractor's facility in which classified information is maintained, and a research facility.

20. The method of claim 17, wherein computing devices are wireless devices, the network is a wireless network, and the present subscriber and the other present subscribers are physically located in the real space.

* * * * *